E. E. WINKLEY.
AUTOMATICALLY CONTROLLED SHOE MACHINE.
APPLICATION FILED MAY 25, 1916.
1,310,491.
Patented July 22, 1919.
12 SHEETS—SHEET 1.
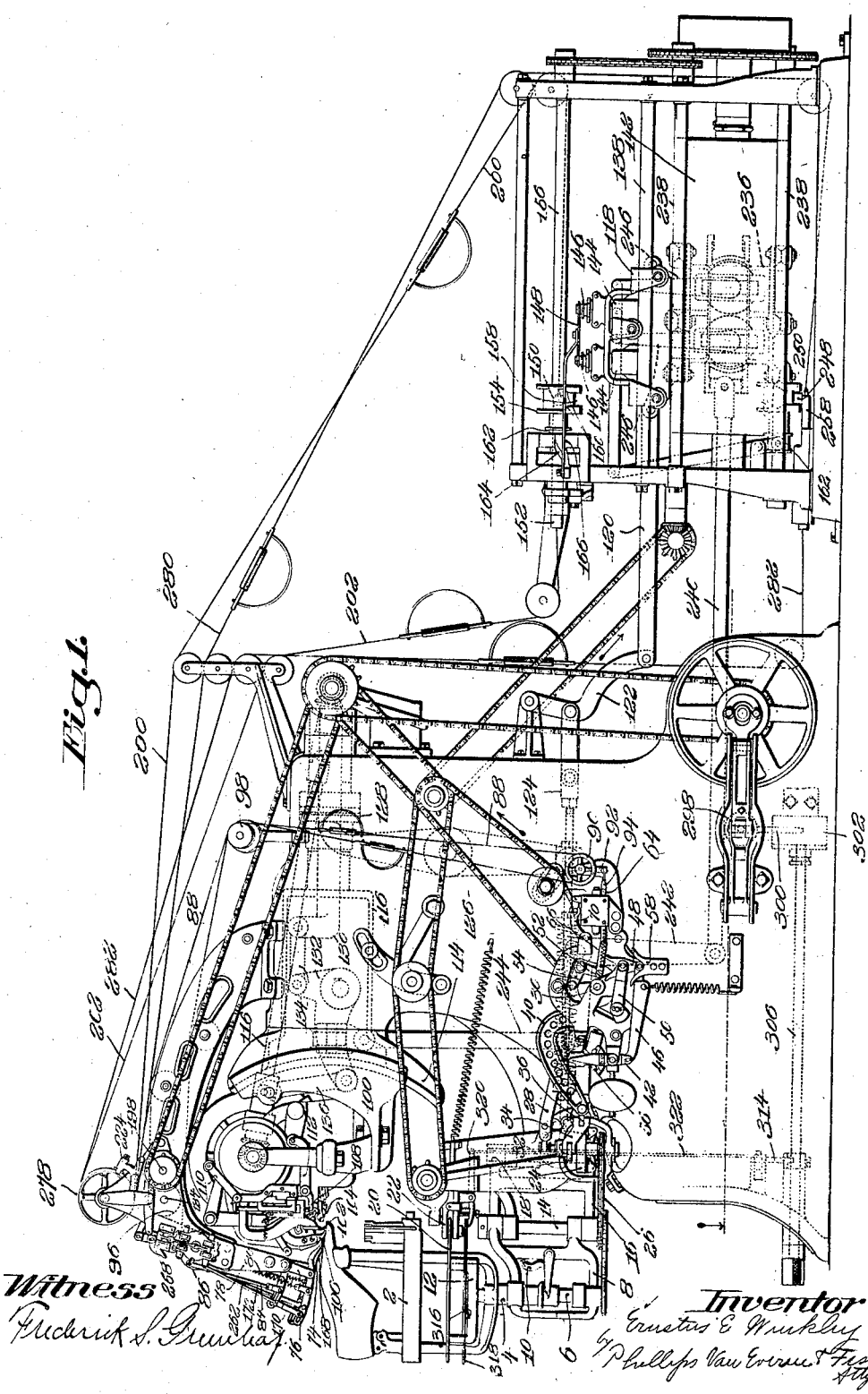

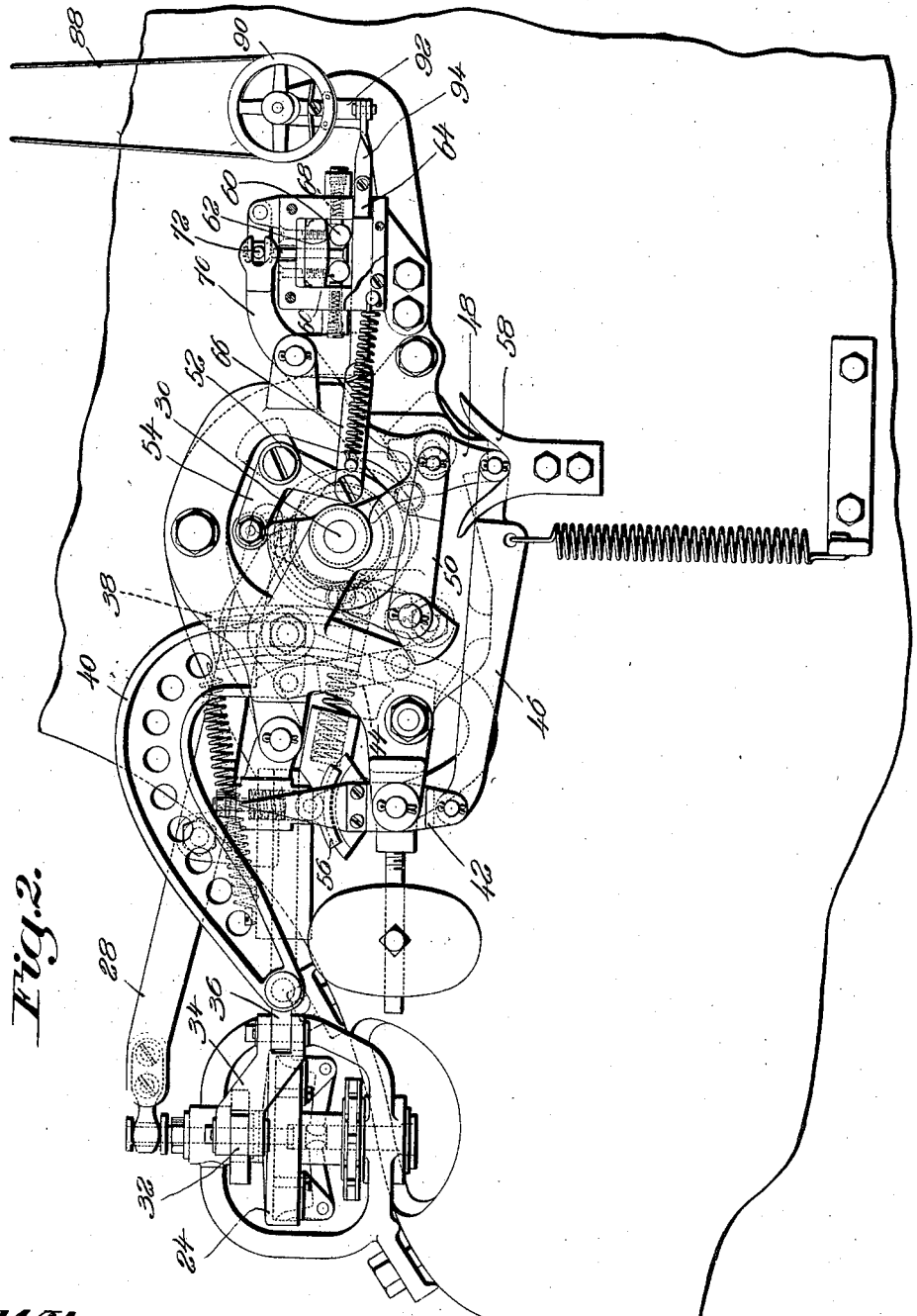
E. E. WINKLEY.
AUTOMATICALLY CONTROLLED SHOE MACHINE.
APPLICATION FILED MAY 25, 1916.
1,310,491.
Patented July 22, 1919.
12 SHEETS—SHEET 2.

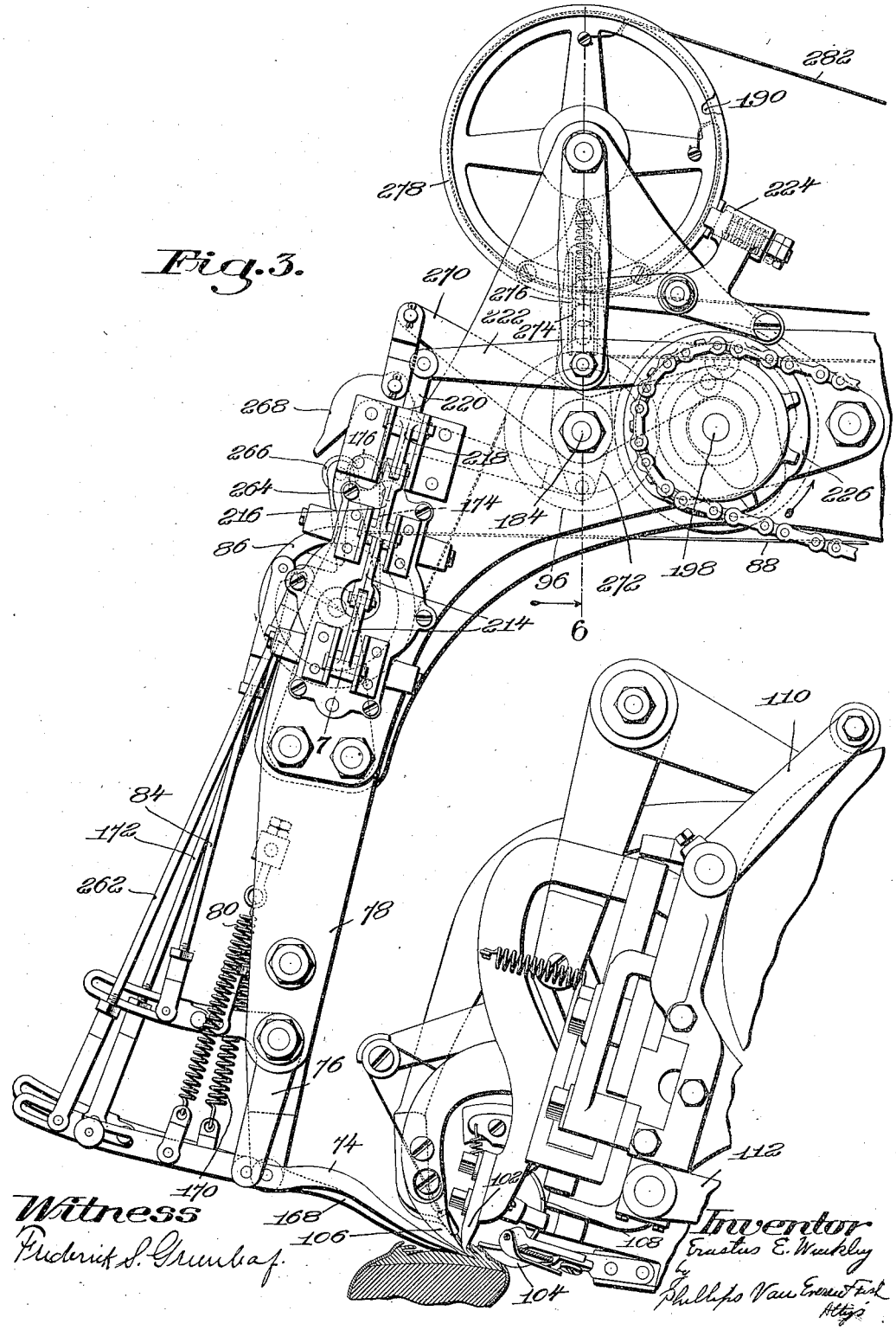

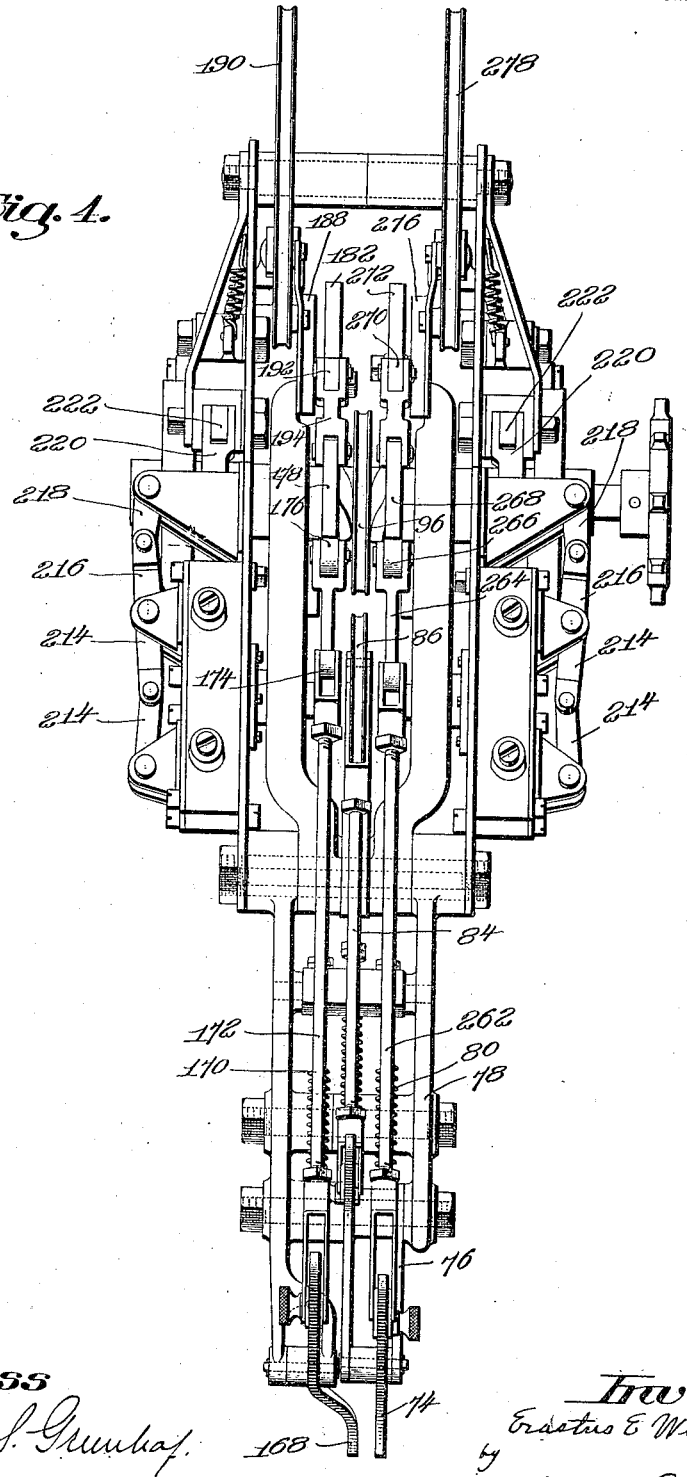

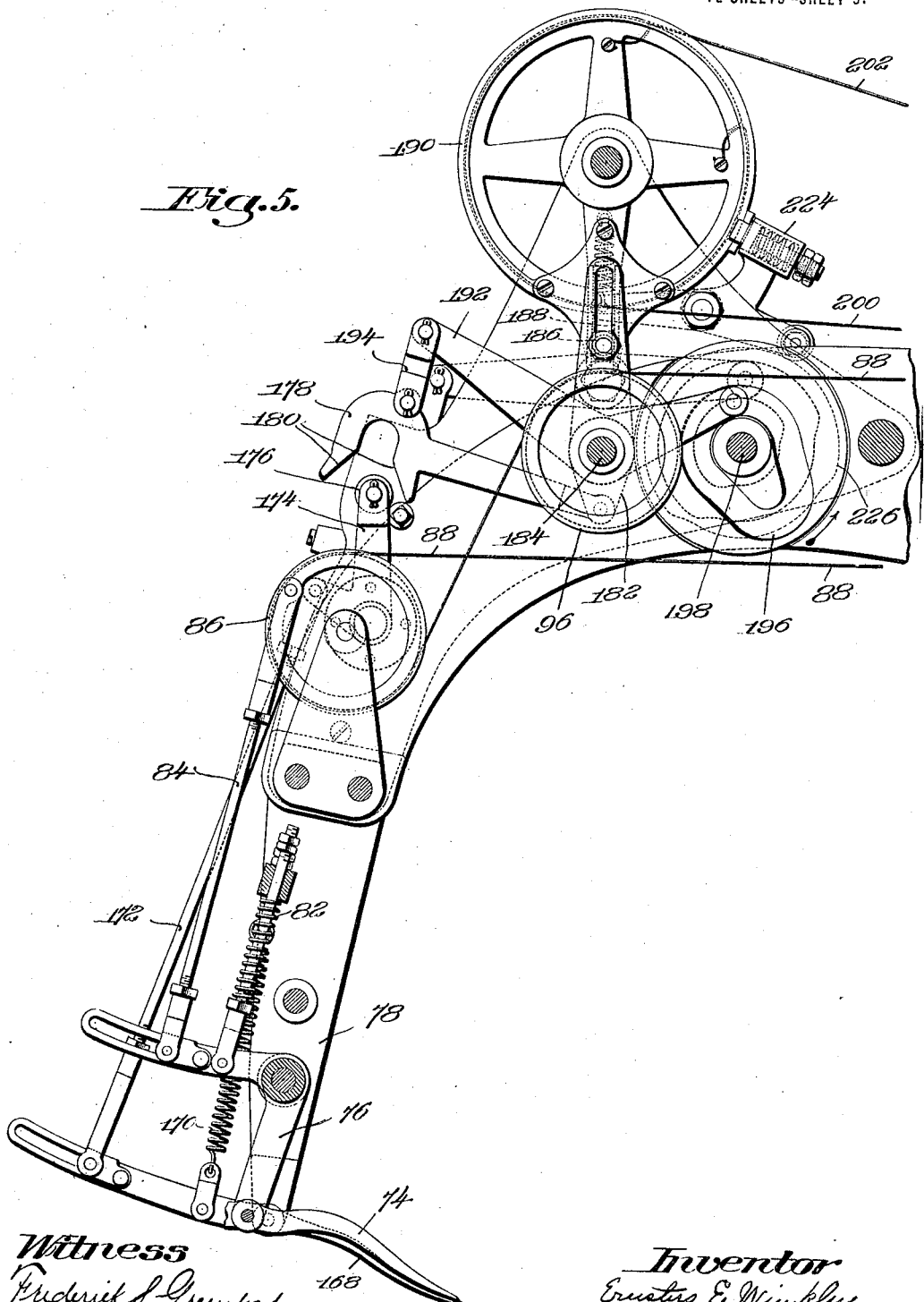

E. E. WINKLEY.
AUTOMATICALLY CONTROLLED SHOE MACHINE.
APPLICATION FILED MAY 25, 1916.
1,310,491.
Patented July 22, 1919.
12 SHEETS—SHEET 6.
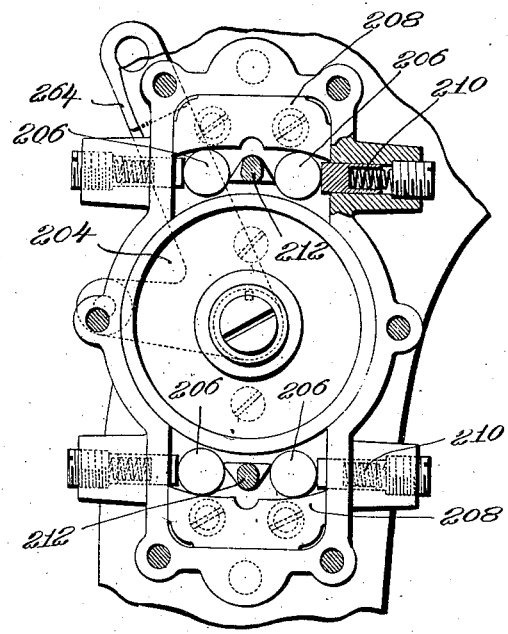
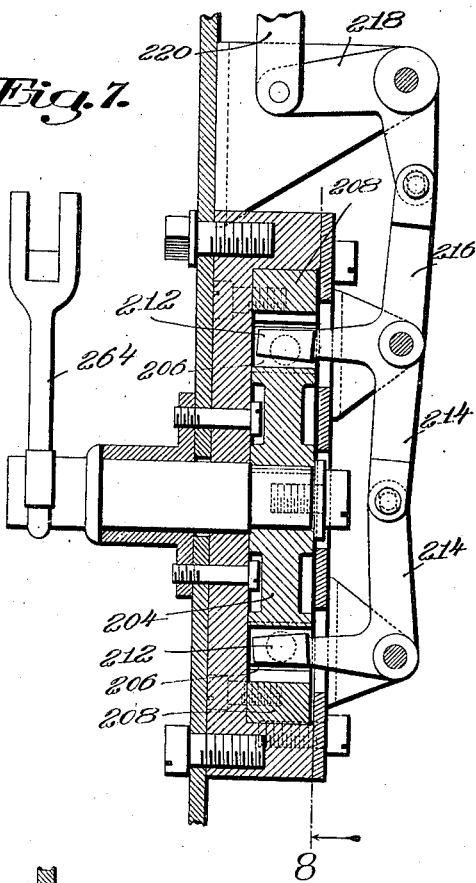
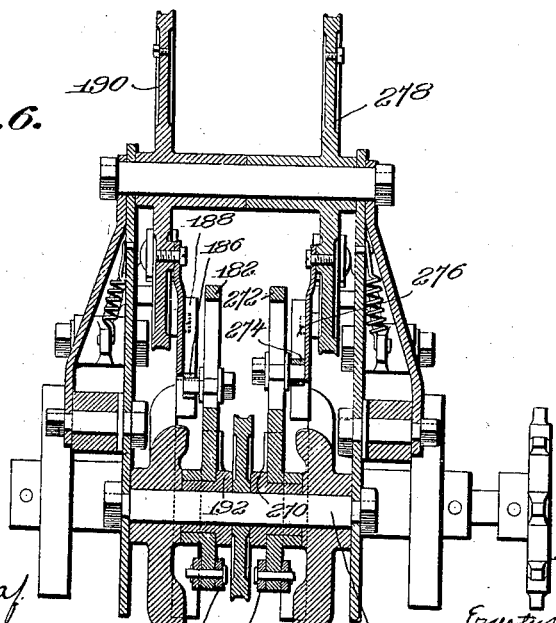

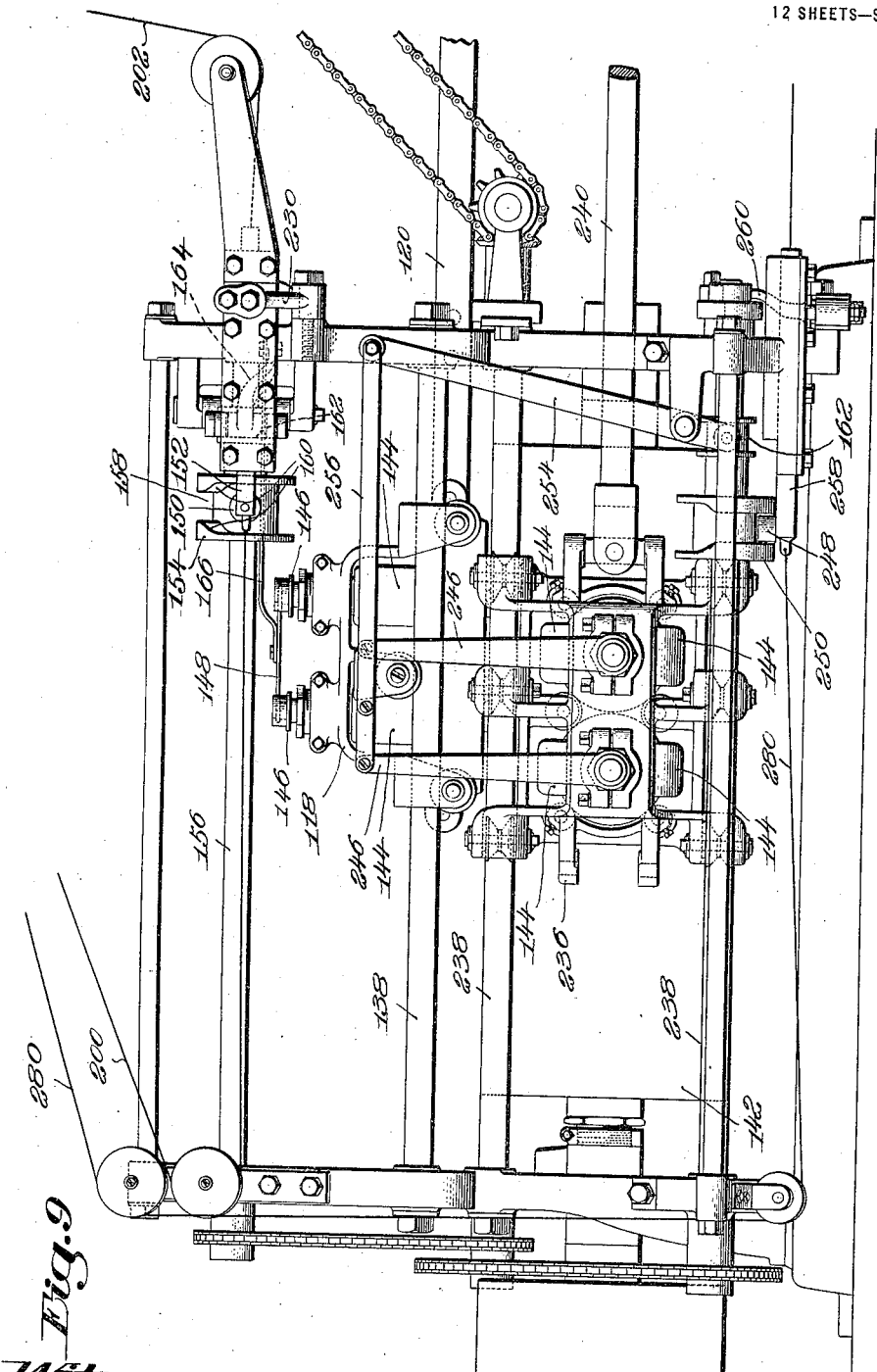

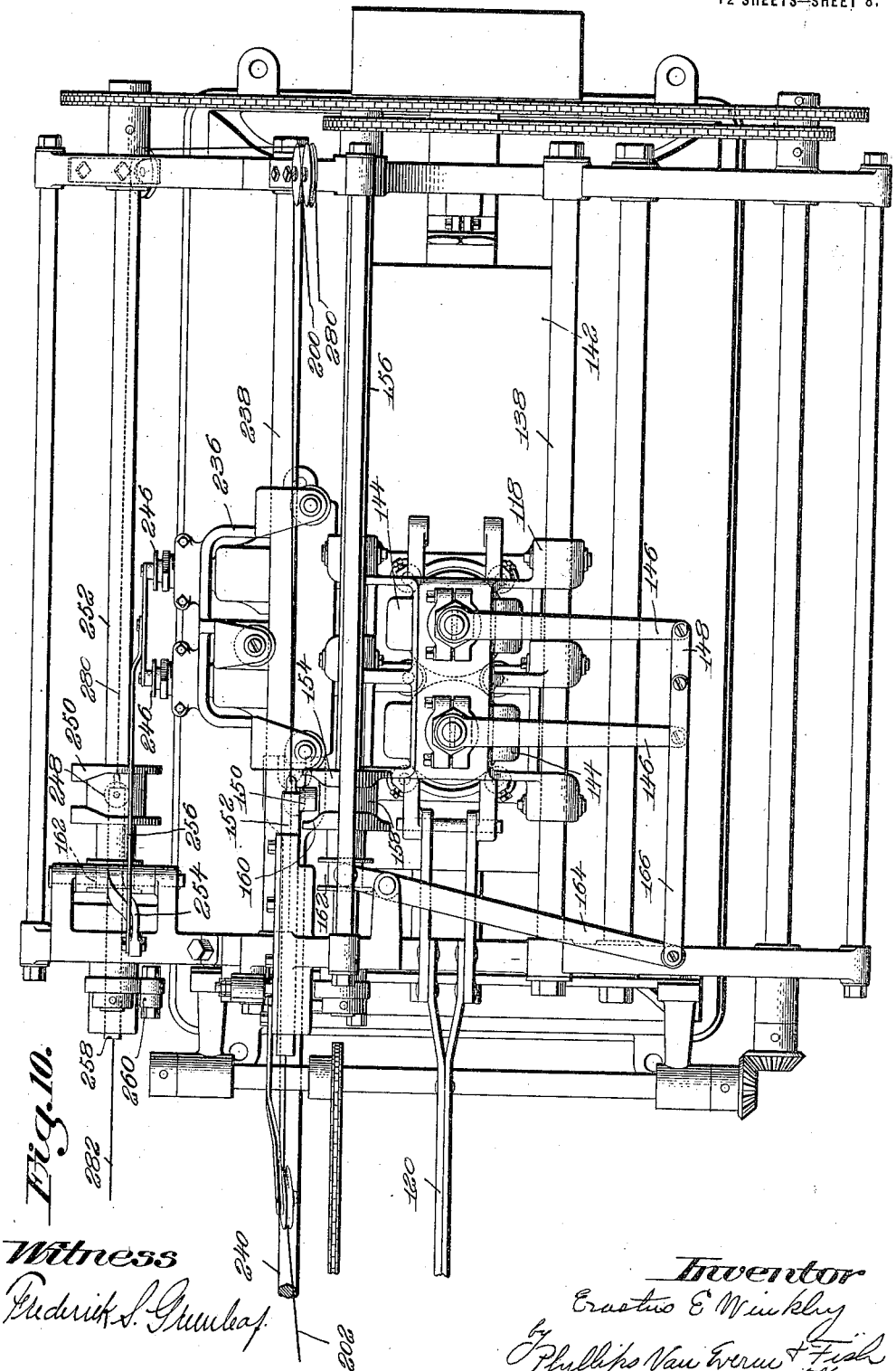

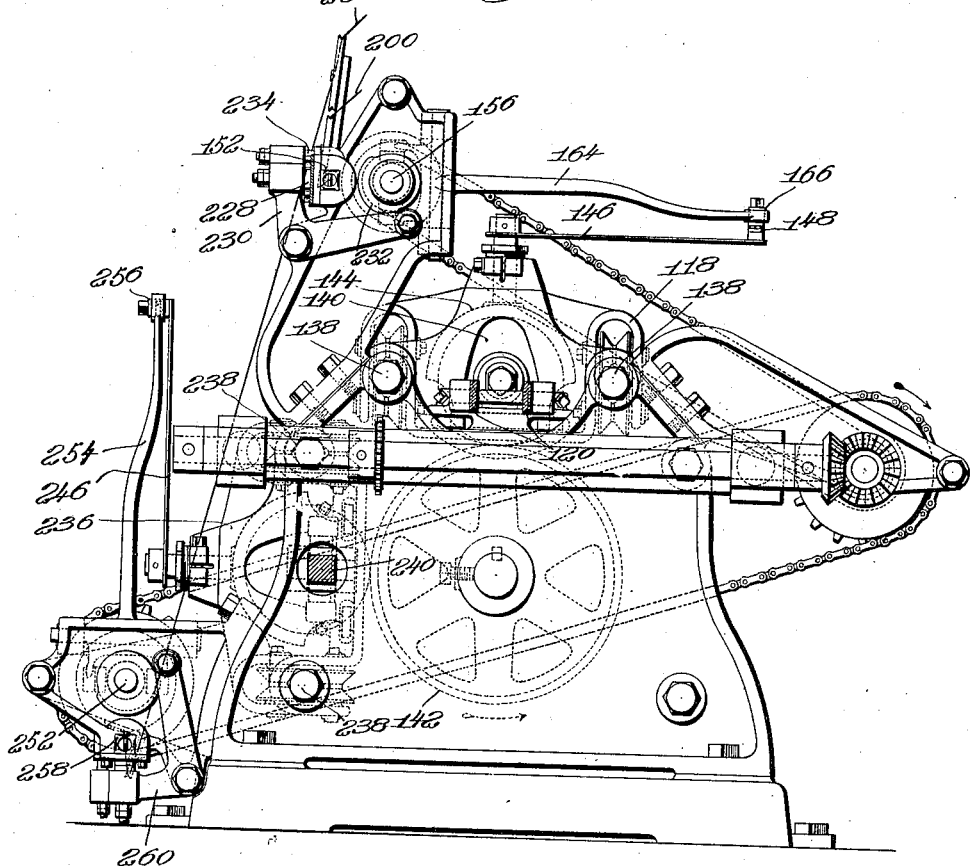

E. E. WINKLEY.
AUTOMATICALLY CONTROLLED SHOE MACHINE.
APPLICATION FILED MAY 25, 1916.
1,310,491.
Patented July 22, 1919.
12 SHEETS—SHEET 10.
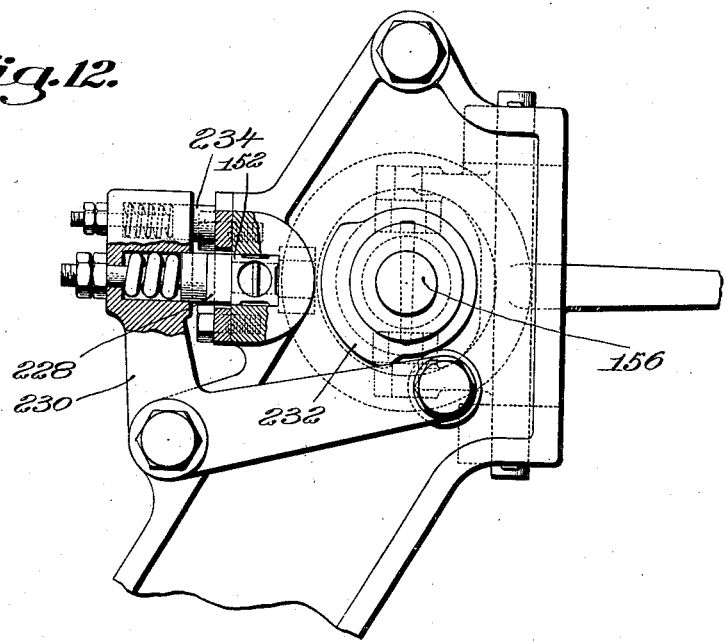
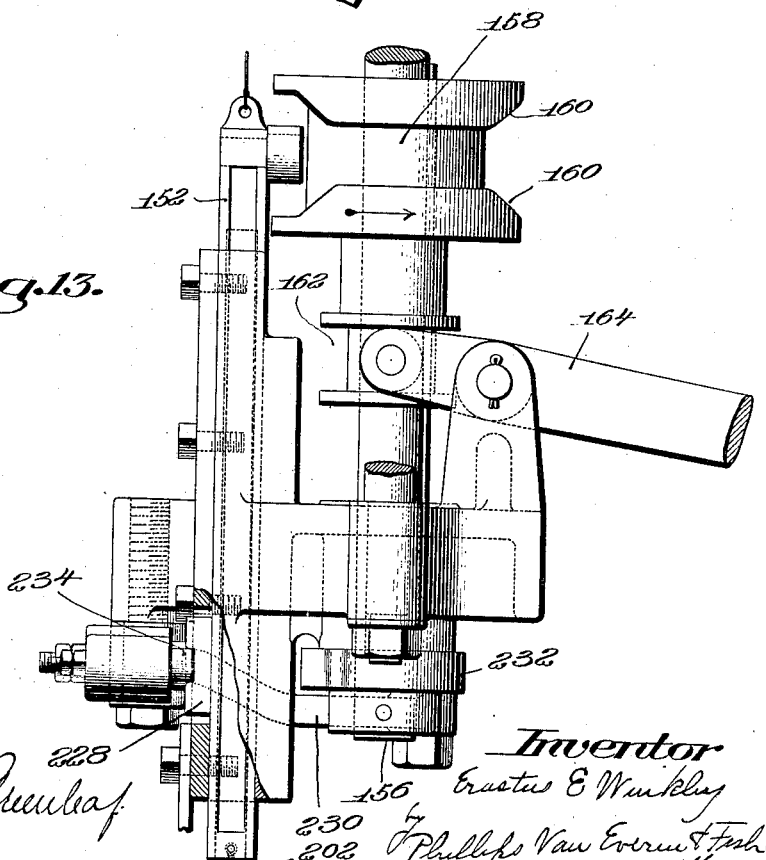

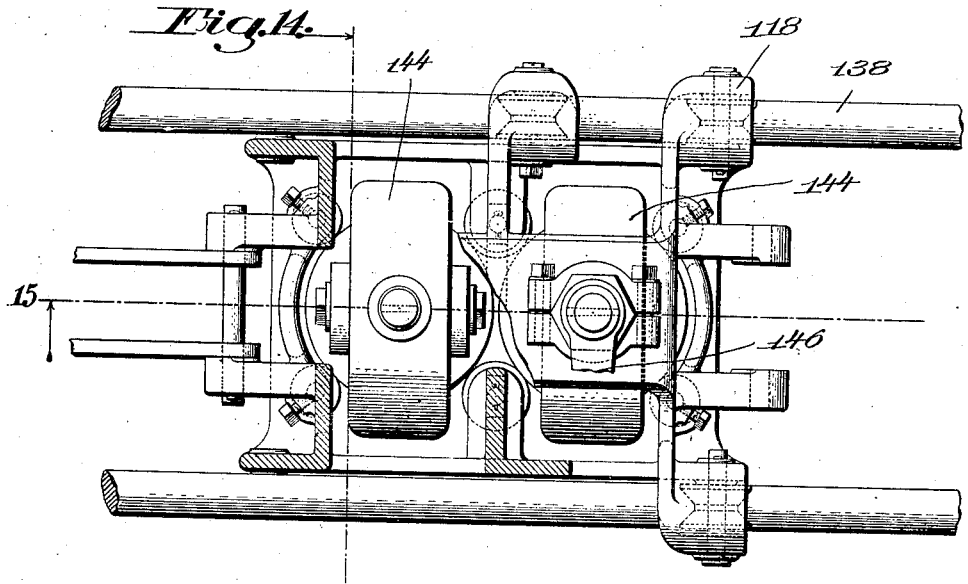
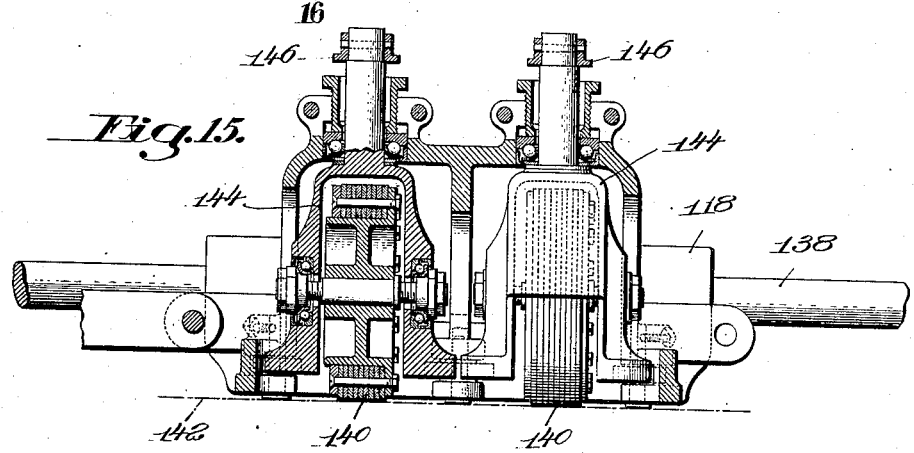
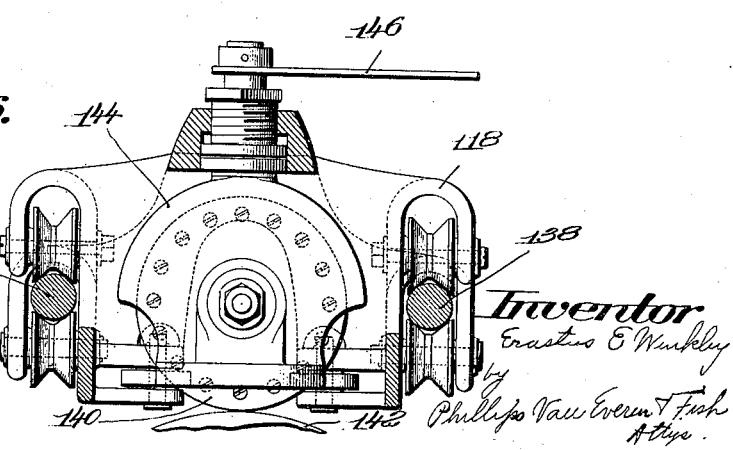

E. E. WINKLEY.
AUTOMATICALLY CONTROLLED SHOE MACHINE.
APPLICATION FILED MAY 25, 1916.
1,310,491.
Patented July 22, 1919.
12 SHEETS—SHEET 12.
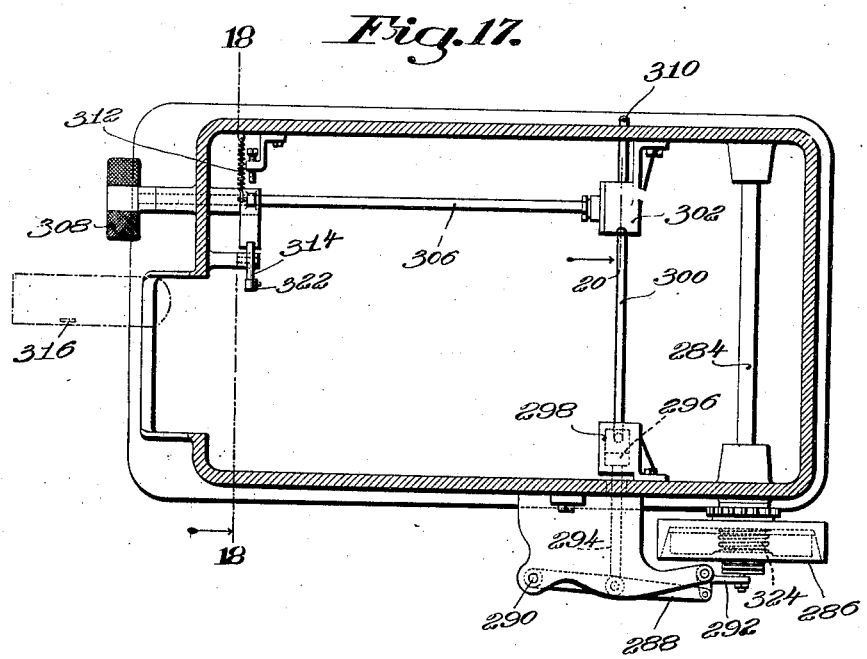
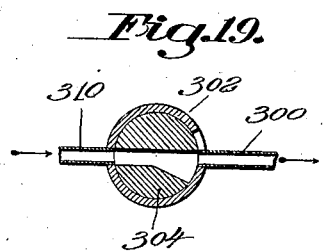
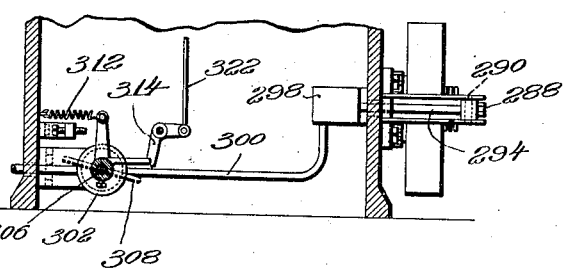
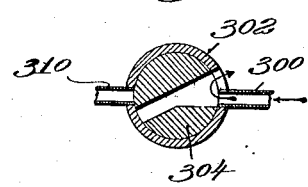
Witness
Inventor
Erastus E Winkley
by Phillips Van Everen Fish
Attys.

UNITED STATES PATENT OFFICE.

ERASTUS E. WINKLEY, OF LYNN, MASSACHUSETTS, ASSIGNOR, BY MESNE ASSIGNMENTS, TO UNITED SHOE MACHINERY CORPORATION, OF PATERSON, NEW JERSEY, A CORPORATION OF NEW JERSEY.

AUTOMATICALLY-CONTROLLED SHOE-MACHINE.

1,310,491.     Specification of Letters Patent.     Patented July 22, 1919.

Application filed May 25, 1916. Serial No. 99,751.

*To all whom it may concern:*

Be it known that I, ERASTUS E. WINKLEY, a citizen of the United States, residing at Lynn, in the county of Essex and State of Massachusetts, have invented certain new and useful Improvements in Automatically-Controlled Shoe-Machines; and I do hereby declare the following to be a full, clear, and exact description of the invention, such as will enable others skilled in the art to which it appertains to make and use the same.

This invention relates to automatic machines in which the requisite relative movements between the work and means for operating thereon are automatically controlled and effected to maintain the work and operating means in proper relation as the point of operation progresses along the work.

In welt and turn sewing machines, outsole stitchers, rounding and channeling machines, and various other shoe machines, it is necessary during the feed of the shoe to change the angular relation of the operating means and work by relatively tipping the operating means and shoe both transversely and longitudinally of the line of feed to maintain the operating means and shoe in the proper relation at the point of operation. It is the primary object of the invention to provide novel and improved mechanism for accurately determining and effecting the relative transverse and longitudinal tipping movements requisite for maintaining the operating means and work in the proper positions. To this end the invention contemplates controlling the corrective tipping movements by the contour of the work along or adjacent to the path of travel of the point of operation along the work. The longitudinal and transverse tipping movements are preferably thus controlled by feelers arranged to act along the shoe adjacent to the path of operation of the operating means, and connected to determine and control the corrective movements imparted to the shoe or operating means by the tipping mechanisms. The preferred form of the invention is especially designed for use in an automatic machine for sewing the inseams of welt or turn shoes, and in the drawings the invention is shown embodied in such a machine.

In addition to the features outlined above, the invention includes further features of construction and combinations of parts hereinafter described and set forth in the claims, the advantages of which will be understood by those skilled in the art from the following detailed description of a machine embodying the invention in its preferred form.

In the drawings Figure 1 is a side elevation showing a machine for automatically sewing the inseams of welt or turn shoes, embodying the invention in its preferred form; Fig. 2 is a side elevation showing the mechanism for swinging the jack; Fig. 3 is an enlarged detailed view showing the sewing mechanism and feelers, and parts of the mechanism controlled by the feelers; Fig. 4 is a front elevation of the parts of the controlling mechanism shown in Fig. 3; Fig. 5 is an elevation of parts of the controlling mechanism similar to Fig. 3, with certain parts removed to more clearly show the parts behind; Fig. 6 is a sectional view on line 6, Fig. 3; Fig. 7 is a sectional view on line 7, Fig. 3; Fig. 8 is a sectional view on line 8, Fig. 7; Fig. 9 is a side elevation of the mechanism for tipping the sewing head, and showing on a larger scale the side of the mechanism opposite to that shown in Fig. 1; Fig. 10 is a plan view of the mechanism shown in Fig. 9; Fig. 11 is an end view of the mechanism shown in Fig. 9, looking toward the left in said figure, and toward the right in Fig. 1; Figs. 12 and 13 are end and plan views showing in detail parts of the mechanism for controlling the tipping of the sewing head; Fig. 14 is a plan view of one of the roll carriages forming a part of the mechanism for tipping the sewing head; Fig. 15 is a sectional view, partly in elevation, on line 15, Fig. 14; Fig. 16 is a sectional elevation on line 16, Fig. 14; Fig. 17 is a sectional plan view indicating parts of the mechansm for stopping the machine at the completion of a shoe; Fig. 18 is a sectional elevation on line 18, Fig. 17; and Figs. 19 and 20 are sectional details on line 20, Fig. 17, showing the clutch controlling valve in different positions.

In the drawings the invention is shown as embodied in a machine similar in some respects to the machines shown and described in Patents Nos. 1,082,185, December 23, 1913, and 1,088,390, February 24, 1914. In this machine the means for operating on the shoe consists of a sewing mechanism which is similar in construction to the well-known Goodyear welt and turn sewing machine shown and described in Patent No. 412,704, October 8, 1889. The shoe to be operated on is carried on a freely movable and rotatable jack which is automatically swung during the sewing to maintain the bottom of the channel or base of the insole lip in the line of feed by correcting mechanism which is controlled by a feeler acting along the channel approximately at the sewing point. The sewing mechanism is mounted on a support or head which is automatically tipped both transversely and longitudinally of the feed during the sewing to maintain the sewing mechanism in proper relation to the surface of the sole at the sewing point by correcting mechanisms which are controlled by feelers acting along the surface of the sole adjacent to the channel and approximately at the sewing point. For the sake of simplicity it is preferred to utilize the same feeler for controlling the swinging movements of the jack and the longitudinal tipping movements of the sewing mechanism, the horizontal position of the end of the feeler determining the swing of the jack, and the vertical position of the end of the feeler determining the tipping of the sewing mechanism. The transverse tipping of the sewing mechanism is determined and controlled by the vertical position of a second feeler, which engages the shoe sole within the channel.

In the machine shown, the shoe supporting jack and mechanism for swinging it is substantially the same as that shown and described in Patent No. 1,088,390. The jack 2 is secured upon the upper end of a sleeve 4 which surrounds a shaft 6 mounted in the outer end of a supporting arm 8. The jack is forced yieldingly toward the sewing mechanism by a spring engaging one arm of a bell crank lever 10, the other arm of which engages a collar on the sleeve 4. The sleeve is free to slide vertically upon the shaft, and is connected to turn with the shaft by means of a yoke 12 secured to the upper end of the shaft, having one of its arms slotted to embrace one of the arms of the jack. The rear end of the supporting arm 8 is mounted to turn freely about a shaft 14 which is mounted in bearings in the outer end of a second arm 16, the rear end of which is mounted to turn freely upon a shaft 18 mounted in the frame of the machine. These supporting devices permit the jack to be moved freely in any direction for presenting a shoe to the sewing mechanism, and in manipulating it during the feed of the shoe. The shoe is swung while the needle is in the work, and in order that the strain may be taken off the needle, the machine is provided with grippers which engage the edge of a plate 20 carried by the yoke 12, and act to constrain the jack to swing about the point engaged by the needle. The feeding awl is also assisted in feeding the shoe by feeding grippers 22 engaging the plate 20. The feeding and pivot grippers are fully shown and described in the patent above referred to.

The mechanism for swinging the jack and shoe comprises a two-way Horton clutch 24 which is connected with the shaft 6 through sprocket chains indicated at 26, and fully shown and described in the patent above referred to (Figs. 1 and 2). The clutch is engaged and disengaged at proper intervals through a lever 28 operated by a cam carried by a cam shaft 30 which is continuously driven, and makes one revolution for each cycle of the sewing mechanism. The driving member of the clutch 24 is operated through a lever 32 connected by a link 34 with a sliding bar 36, and operated by an actuating lever 38 through a link 40, one end of which is connected with the bar 36, and the other end of which is connected to a block mounted to slide in a segmental slot formed in the lever. The slot in the actuating lever is arranged to extend on opposite sides of the fulcrum of the lever, and the extent and direction of movement imparted to the clutch, and through it to the jack, will depend upon the position of the block with relation to the fulcrum of the lever. The block is shifted in the actuating lever through a lever 42, one arm of which is connected by a link 44 to the link 40, and the other arm of which is connected by a link 46 to the lower end of a controller cam plate 48 which is pivoted to one arm of a bell crank lever 50, the other arm of which carries a roll engaging a cam on the cam shaft 30. The upper end of the controller plate 48 is provided with a V-shaped mouth, the sides of which form oppositely inclined cam surfaces for engaging a controller roll 52 carried by one arm of a bell crank lever 54, the other arm of which engages a cam on the cam shaft 30. At the time the controller cam plate 48 is raised by its actuating cam, the bell crank lever 54 carrying the controller roll 52 is free of its cam, and the position of the roll is determined by a feeler engaging the channel of the shoe, the roll being in central or neutral position in case the point engaged by the feeler is in the line of feed, but being displaced either one side or the other of its neutral position in case the point engaged by the feeler is out of the line of feed. If the controller roll is out of neutral position when the controller cam plate is raised, one of the inclined cam surfaces on the plate will ride against the roll, swinging the plate, and through the link 46 and arm 42 moving the pivot block in the actuator lever 38 out of line with the fulcrum of the lever, and thus causing a swinging movement to be imparted to the jack to bring the point on the shoe engaged by the feeler into the line of feed. When the pivot block is positioned in the actuating lever it is locked in position during the active stroke of the lever by a clamp 56. When the controller cam plate 48 returns to its lower position it is swung into neutral position by the cam 58, thus returning the pivot block to neutral position in the actuating lever 38, preparatory to the succeeding corrective movement of the jack swinging mechanism. When the controller roll 52 is positioned by the feeler, it is locked in position during the operation of the controller cam plate by wedging clamping rolls 60 arranged between wedging surfaces 62 and a sliding bar 64, which is connected with the roll 52 by a link 66. The rolls are forced into active position by springs 68, and are moved into inactive position by a lever 70, one end of which engages a roll operating rod 72, and the other end of which engages a cam on the cam shaft 30.

The feeler 74 for engaging the channel of the shoe and controlling the position of the roll 52, and through it the corrective swinging movements which are to be imparted to the jack, is in the form of a finger pivoted to the lower end of the vertical arm of a bell crank lever 76, which is in turn pivoted to an overhanging arm 78 mounted upon the frame of the machine (Figs. 1, 3, 4 and 5). The free end of the feeler finger 74 is forced yieldingly against the surface of the shoe sole by a spring 80, and is forced horizontally against the base of the channel by a spring 82 acting on the arm of the bell crank carrying lever 76. The horizontal arm of the bell crank lever is connected by a link 84 with a disk 86 which is in turn connected by a band or wire 88 with a disk 90 provided with a radial arm 92 which is connected by a link 94 with the sliding bar 64 and through it to the controller roll 52. The wire 88 is supported and guided between the disks 86 and 90 by guide rolls 96 and 98. The feeler is arranged to engage the channel about a stitch length in advance of the sewing point, and through the connections described determines the position of the controller roll, so that during the time the needle is in the work the jack is swung by the correcting mechanism to bring the point in the channel which is engaged by the feeler, and which is to be engaged by the feed awl, preparatory to the next feeding movement of the shoe, into the line of feed. After the controller roll 52 has been positioned, and the controller plate 48 has acted to set the mechanism for swinging the jack, the cam acting on the roll carrying lever 54 acts to swing the lever into the position indicated in Fig. 2, and to withdraw the feeler finger 74 from engagement with the channel, so that it will not interfere with the return movement of the feed awl and channel guide. The cam releases the roll carrying lever and allows the feeler to reëngage the base of the channel after the channel guide and awl have advanced to feed the shoe.

The sewing mechanism is mounted upon a support 100, and comprises a channel guide 102, a welt guide or back gage 104, a feeding awl 106, a needle 108, and the usual coöperating stitch forming devices. The channel guide and feed awl may, if it is found desirable, be mounted to move vertically on the feed slide to accommodate themselves to the vertical position of the surface of the sole, and may be brought into proper vertical relation to the needle previous to the passage of the needle through the stock by levers 110 and 112, as indicated in Figs. 1 and 3, and more fully explained in Patent No. 1,030,043, June 18, 1912.

The support or head 100 for the sewing mechanism is mounted to slide on segmental ways 114 which are concentric with the point of operation of the sewing mechanism, so that by moving the head upon the ways the sewing mechanism may be tipped transversely of the line of feed about the point of operation of the sewing mechanism. The ways 114 are formed on the end of a rotary carrier 116 mounted to turn about a horizontal axis passing through the point of operation of the sewing mechanism, so that by turning the carrier the sewing mechanism may be tipped longitudinally of the feed about the point of operation of the sewing mechanism. The mechanism for moving the head 100 on the ways 114 comprises a reciprocating roll carriage 118 connected by a link 120 to a lever 122, which in turn is connected by a link 124 with the lower end of a lever 126, the upper end of which bears against a sleeve 128 mounted to slide on the carrier 116, and connected with the head through a bar 130, lever 132, and links 134 and 136, as more fully described in Patent No. 1,082,185 (Figs. 1, 9, 10, and 14 to 16). The roll carriage 118 is mounted to reciprocate on guide bars 138, and carries two rolls 140 which engage a continuously rotating drum 142. The rolls are mounted in roll carriers 144 which are pivotally supported in the carriage. The outer ends of the roll carriers are provided with arms 146, the ends of which are connected by a link 148, so that the roll carriers will move in unison. So long as the rolls are in position with their axes parallel to the axis of the drum, they will rotate idly in contact with the drum, and no movement will be imparted to the roll carriage. If, however, the rolls are turned at an angle, then they will travel lengthwise of the drum until their axes are again parallel to the axis of the drum, thus moving the roll carriage on its ways in one direction or the other, according to the direction in which the roll carriers are turned. Movement of the roll carriage in either direction will, through the connections described, tip the sewing mechanism transversely, and the transverse tip of the sewing mechanism will be determined by the position of the roll carriage along the drum. The position of the roll carriage is varied and determined through a controller in the form of a roll 150 carried by a sliding bar 152 and arranged to be engaged by a controller cam 154. The controller cam is in the form of a sleeve mounted to rotate with and slide longitudinally on a shaft 156, which makes one revolution for each cycle of the sewing mechanism. The cam is provided with a central groove 158 having a width approximately the diameter of the controller roll 150, and is also provided with oppositely inclined cam surfaces 160 leading to the groove 158. The cam sleeve is also provided with an annular groove 162 arranged to engage a roll on the short arm of a lever 164, the long arm of which is connected by a link 166 with the link 148 connecting the arms of the roll carriers.

If the controller roll 150 is in line with the central groove 158 of the controller cam at the time the roll enters the groove, the roll passes idly through the groove and the roll carriage, and consequently the head supporting the sewing mechanism remains in position. If the controller roll is at one side or the other of this position, however, when it enters the groove 158 in the controller cam, one of the cam surfaces 160 will ride against a roll, shifting the controller cam sleeve on its shaft and swinging the lever 164. This movement of the lever will turn the roll carrier arms 146 and turn the rolls at an angle to the drum, so that the rolls will travel longitudinally of the drum until, by reason of their travel, they are brought into position with their axes parallel to the axis of the drum. The movement thus imparted to the roll carriage will change the lateral tip of the sewing mechanism.

The position of the controller roll 150, and consequently the lateral tip of the sewing mechanism, is determined by a feeler finger 168 which is pivoted to the arm 78 and pressed against the surface of the sole by a spring 170. The free end of the feeler finger is arranged to bear upon the sole just within the channel, and approximately in transverse alinement with the sewing point. The feeler finger is in the form of a lever, the outer end of which is connected by a link 172 with the horizontal arm of a bell crank lever 174, the vertical arm of which carries a controller roll 176. Coöperating with the controller roll is a reciprocating controller cam plate 178 provided with oppositely inclined cam surfaces 180. The controller cam plate is formed on the front end of an arm, the rear end of which is pivoted to a lever 182 mounted on a stud 184 and carrying near its upper end a roll 186 which engages a groove 188 formed in an arm projecting radially from a disk 190 (Figs. 3, 4, 5 and 6). The controller cam plate is moved toward and from the controller roll by a lever 192, the forward end of which is connected to the cam plate by a link 194, and the rear end of which carries a roll engaging a cam 196 secured to a shaft 198 which makes one revolution for each cycle of the sewing mechanism. The disk 190 is connected with the bar 152 which carries the controller roll 150 by wires 200 and 202 which pass over suitable guide rolls and have their ends secured to the bar and disk. The controller roll 176 is locked in position during the movement of the controller cam plate toward the roll by a wedging roll clamp which is a duplicate of the clamp shown in Figs. 3, 7 and 8 for locking the controller roll through which the longitudinal tip of the sewing mechanism is controlled. This clamp comprises a drum 204 secured to the outer end of the shaft which carries the controller roll carrier lever 174, and coöperating wedging rolls 206 arranged between the surface of the drum and eccentric surfaces on the wedge blocks 208. The rolls are forced into wedging or locking position by springs 210, and are forced out of locking position by the horizontal arms 212 of connected bell crank levers 214. The upper bell crank lever is provided with an upwardly projecting arm 216 which is connected to one arm of a lever 218, the other arm of which is connected by a link 220 with the forward end of a lever 222, the rear end of which carries a roll engaging a cam secured to the cam shaft 198. A clamping lever 224 is forced against the periphery of the disk 190 by a cam 226, except during the reciprocation of the controller cam plate 178.

The feeler finger 168 by its engagement with the surface of the shoe sole positions the controller roll 176, and at about the time in the cycle of the sewing mechanism that the feed of the shoe has been completed, the roll is locked in position, and the controller cam plate 178 is moved downward toward the roll. If the roll is not in position to enter the slot between the cam surfaces 180, one of the cam surfaces will ride against the roll, moving the controller cam plate and rocking the lever 182 and the connected disk 190. This movement of the disk 190 will shift the bar 152, carrying the controller roll 150 into a position corresponding to the position of the end of the feeler. The bar 152 will then be locked, and the controller cam plate 178 will be immediately raised to free it from the controller roll 176 and the controller roll will be unlocked. While the needle is through the work the controller cam 154 will act upon the controller roll 150 to vary the lateral tip of the sewing mechanism, in case the feeler has indicated a change in the lateral inclination of the shoe sole between the point engaged by the feeler during this cycle and the point engaged by the feeler during the preceding cycle. Should the lateral inclination of the sole at the point engaged by the feeler be the same as the lateral inclination at the point engaged thereby during the preceding cycle, the controller roll 176 will be brought to the same position by the feeler during each cycle, and there will therefore be no change in the position of the controller roll 150, and consequently no change in the position of the roll carriage and lateral inclination of the sewing mechanism. Whenever there is a change in the lateral inclination of the sole, however, there will be a corresponding change in the position to which the controller roll 176 is brought, and a corresponding change in the position of the controller roll 150, which will cause a change in the position of the roll carriage, and in the lateral inclination of the sewing mechanism. When the bar 152 carrying the controller roll 150 is positioned by the feeler and connected controlling mechanism, it is locked in position during the action of the controller cam 154 thereon by a clamp 228 yieldingly mounted in a clamp lever 230 which is operated by a cam 232 on the shaft 156. The lever is held in engagement with the cam by a spring pressed pin 234 mounted in the lever and engaging one of the guide plates which retains the bar in its guideway (Figs. 12 and 13).

It will be seen that through the mechanism above described the feeler during each cycle of the sewing mechanism detects any change in the lateral inclination of the sole, and sets the correcting mechanism so that this mechanism will, during the time that the needle is in the work, effect a corresponding change in the transverse inclination of the sewing mechanism, thus maintaining the shoe and sewing mechanism in proper relation transversely of the feed during the transfer of the point of operation of the sewing mechanism about the shoe.

The mechanism for turning the carrier 116 to tip the sewing mechanism longitudinally of the feed is similar to the mechanism for tipping the sewing mechanism transversely, and comprises a roll carriage 236 mounted to reciprocate on guide rods 238, and connected with the carrier 116 through a link 240, bell crank lever 242, and link 244 (Figs. 1, 9, 10 and 11). The roll carriage carries two rolls engaging the drum 142 mounted in roll carriers provided with connected arms 246 through which the roll carriers may be turned to cause a travel of the carriage in either direction along the drum. The position of the roll carriage determines the longitudinal tip of the sewing mechanism, and the position of the carriage is controlled and determined by a controller roll 248 and a coöperating controller cam sleeve 250 mounted on a shaft 252 and connected with the roll carrier arms 246 through a lever 254 and link 256. The controller roll 248 is carried on a sliding roll carrier bar 258, and the position of the roll and bar is controlled and determined by a shoe engaging feeler and connecting mechanism which is a substantial duplicate of the mechanism for controlling and determining the position of the controller roll 150, the position of which determines the transverse tip of the sewing mechanism. The roll carrying bar is clamped in position during the operation of the controller cam 250 by a clamp lever 260 corresponding in construction to the clamp lever 230.

For the sake of simplicity the controller finger 74 which controls the swing of the jack is also utilized as the controller finger for controlling the longitudinal tip of the sewing mechanism. In the construction shown the outer end of this finger is connected by a link 262 to a bell crank lever 264, the upper end of which carries a controller roll 266. A coöperating controller cam plate 268 is reciprocated by a lever 270 and cam on the cam shaft 198, and acts through a lever 272, roll 274, and grooved radial arm 276 on the disk 278 to turn the disk in accordance with the position of the controller roll 266. The disk 278 is connected through wires 280 and 282 to the controller roll carrying bar 258, so that the movement imparted to the disk 278 through the controller cam plate 268 determines the position of the controller roll 248. The controller roll 266 is locked in position during the operation of the controller cam plate 268 by the locking mechanism shown in Figs. 7 and 8, and already described.

During each cycle of the sewing mechanism the end of the feeler finger 74 engages the surface of the sole at the base of the channel and positions the controller roll 266, thus determining through the controlling mechanism described the position of the roll carriage longitudinally of the drum, and consequently the longitudinal tip of the sewing mechanism. So long as the longitudinal inclination of the shoe sole at the point of operation is unchanged, the controller roll 266 will be brought to the same position by the engagement of the feeler with the shoe during each cycle, and there will be no change in the position of the roll carriage and in the longitudinal tip of the sewing mechanism. When any change in the longitudinal inclination of the sole at the point of operation occurs, this change will be detected by the feeler, and will result in a change in the position of the controller roll 266, and a consequent change in the position of the controller roll 248. This will cause the roll carriage to travel longitudinally of the drum in a direction and through a distance corresponding to the setting of the controller roll, thus changing the longitudinal tip of the sewing mechanism to correspond to the change in the longitudinal inclination of the shoe sole. Thus the shoe and sewing mechanism are automatically maintained in proper relation longitudinally of the feed during the transfer of the point of operation of the sewing mechanism around the shoe.

In the machine shown, the various mechanisms of the machine are driven through a main driving shaft 284 through a clutch 286 which is engaged by the operator after placing the shoe upon the jack and bringing it into engagement with the sewing mechanism at the point where the sewing is to begin, and which is disengaged automatically when the sewing has progressed to the desired point on the shoe. As indicated in Figs. 1 and 17 to 20, the clutch is engaged and disengaged through toggle levers 288 connected at one end to a fixed pivot 290, and at the other end to a bell crank lever 292 which engages the movable clutch member. The knuckle of the toggle is connected to a rod 294, the rear end of which carries a piston 296 fitting within a cylinder 298. The cylinder is connected by a pipe 300 with a valve casing 302. A valve 304 is mounted in the valve casing, and is carried on the end of a rock shaft 306. The forward end of the rock shaft carries a treadle 308 through which the operator may rock the shaft to bring the valve into the position indicated in Fig. 19, thus connecting the pipe 300 with a pressure supply pipe 310. When the valve is moved into this position, the air pressure admitted into the cylinder 298 will operate the piston 296 to straighten the toggle and thus engage the driving clutch. The valve shaft is latched in this position against the tension of a spring 312 by a latch 314. The valve is retained in this position until the sewing is completed by the latch. When the seam has reached the desired point on the shoe, a cam 316 secured to a plate 318 on the yoke 12 engages the forward end of a tripping lever 320, the rear end of which is connected by a link 322 with the latch 314 and trips the latch to release the valve shaft 306. The valve shaft is immediately rocked by the spring 312 into the position indicated in Fig. 20, thus opening the end of the pipe 300 and relieving the pressure on the piston 296, so that the spring 324 may disengage the clutch, thus stopping the machine.

It will be noted that in the construction described the shoe sole forms in effect a pattern or form along which the feelers travel, and that the relation between the feelers and the form engaged thereby is unaffected by the action of the mechanisms which tip the sewing mechanism, since the feelers are mounted independently of the head which supports the sewing mechanism. It will also be noted that the head tipping mechanisms which are controlled by the feelers are rendered active to move the head and sewing mechanism upon a change and only upon a change in the position of the corresponding feeler when in controlling contact with the sole. These peculiarities are incidental to securing the relative tip between the sewing mechanism and shoe by tipping the sewing mechanism. Feeler controlled mechanisms having these general characteristics may be used with advantage in various machines, and are within the purview of the present invention as defined in certain of the claims.

While the invention has been shown and described as embodied in a machine for sewing the inseams of turn or welted shoes, it will be understood that it is not confined in its application to such machine, but may be embodied with advantage in other machines for operating upon shoes or other work in which it may be desirable to automatically control the relative positions of the work and operating means during the transfer of the point of operation of the operating means along the work. It will also be understood that while it is preferred to employ substantially the construction and operation of parts shown and described in embodying the invention in an inseam sewing machine, this construction and arrangement is not essential to the broader features of the invention, and may be varied or modified as found desirable or best suited to the construction and arrangement of the parts of the machine in which the invention is to be embodied.

Having explained the nature and object of the invention, and specifically described one form of machine in which it may be embodied, what is claimed is:—

1. An automatic machine, having, in combination, operating means and a work support relatively movable to transfer the point of operation along the work, mechanism for relatively tipping the operating means and work both longitudinally and transversely and for relatively swinging the operating means and work, and feelers for engaging the work and controlling said mechanisms.

2. An automatic machine, having, in combination, operating means, mechanism for relatively moving the operating means and work to transfer the point of operation along the work, a work engaging feeler, mechanism controlled by the feeler for imparting relative longitudinal tipping movements to the operating means and work, a second feeler, and mechanism controlled by the second feeler for imparting relative transverse tipping movements to the operating means and work to maintain them in proper relation during the transfer of the point of operation.

3. An automatic machine, having, in combination, operating means, a work support movable to transfer the point of operation of the operating means along the work, mechanisms for relatively tipping the operating means and work about two axes and for swinging the work to maintain the work and operating means in proper relation during the operation on the work, and work engaging feelers for controlling said mechanisms in accordance with the contour of the work along the path of operation.

4. An automatic machine, having, in combination, operating means, a work support movable to transfer the point of operation along the work, mechanisms for tipping the operating means about two axes and for swinging the work to maintain the work and operating means in proper relation during the operation on the work, and work engaging feelers for controlling said mechanisms in accordance with the contour of the work along the path of operation.

5. An automatic machine, having, in combination, operating means, a work support freely movable in a plane and rotatable in that plane to transfer the point of operation along the work, means for automatically feeding the work, a feeler acting along the work, and mechanism controlled by the feeler for relatively tipping the operating means and work to maintain them in proper relation at the point of operation as said point travels along the work.

6. An automatic shoe machine, having, in combination, operating means and a shoe supporting jack relatively movable to transfer the point of operation along the shoe, mechanisms for relatively tipping the operating mechanism and jack both longitudinally and transversely and for swinging the jack, and feelers engaging the shoe for controlling said mechanisms.

7. An automatic shoe machine, having, in combination, mechanism for operating on a shoe, a shoe supporting jack, mechanism for relatively moving the operating means and shoe to transfer the point of operation along the shoe, feelers for engaging the shoe, and mechanism controlled by a feeler for imparting relative transverse tipping movements and by another feeler for imparting relative longitudinal tipping movements to the operating means and shoe to maintain them in proper relation for the operation of the operating means during the transfer of the point of operation along the shoe.

8. An automatic shoe machine, having, in combination, means for operating on a shoe, a shoe supporting jack freely movable in a plane and rotatable in that plane to transfer the point of operation along the shoe, means for automatically feeding the shoe, a feeler acting along the shoe sole, and mechanism controlled by the feeler for relatively tipping the operating means and shoe to maintain them in proper relation to the operating point.

9. An automatic shoe machine, having, in combination, means for operating on a shoe and a shoe supporting jack relatively movable to transfer the point of operation around the shoe, mechanisms for relatively moving the shoe and operating means about a center substantially coincident with the point of operation to maintain the proper relation between the tread surface of the sole and the operating mechanism and for swinging the jack, and feelers engaging the sole for controlling said mechanisms.

10. An automatic shoe machine, having, in combination, means for operating on a shoe, a support therefor, a shoe supporting jack movable to transfer the point of operation around the shoe, mechanism for tipping the support, and a feeler mounted independently of the support for engaging the shoe and controlling the tipping mechanism.

11. An automatic shoe machine, having, in combination, means for operating on a shoe, a support therefor, a shoe supporting jack movable to transfer the point of operation around the shoe, mechanisms for tipping the support transversely and longitudinally, and feelers for engaging the shoe and controlling the tipping mechanisms.

12. An automatic shoe machine, having, in combination, means for operating on a shoe, a shoe supporting jack movable to transfer the point of operation along the shoe, mechanism for feeding the shoe, a feeler for acting along the shoe sole, and mechanism controlled by the feeler for relatively tipping the operating means and shoe transversely to maintain them in proper relation during the operation on the shoe.

13. An automatic shoe machine, having, in combination, means for operating on a shoe, a shoe supporting jack, means for feeding the shoe, mechanism for swinging the jack and for relatively tipping the jack and operating means about two axes, a feeler for engaging the shoe and controlling the swing of the jack and the tip about one axis, and a feeler for engaging the shoe and controlling the tip about the other axis.

14. An automatic shoe machine, having, in combination, means for operating on a shoe, a support therefor, a shoe supporting jack movable to transfer the point of operation around the shoe, mechanisms for tipping the support about two axes intersecting at the point of operation, and feelers for engaging the shoe and controlling the tipping mechanisms.

15. An automatic shoe sewing machine, having, in combination, shoe sewing mechanism, a shoe supporting jack, mechanism for relatively tipping the sewing mechanism and shoe transversely of the feed, and a feeler engaging the shoe sole adjacent the sewing point for controlling the tipping mechanism during the sewing.

16. An automatic shoe sewing machine, having, in combination, shoe sewing mechanism, a shoe supporting jack, mechanism for relatively tipping the sewing mechanism and shoe transversely and longitudinally, and a feeler engaging the shoe adjacent the sewing point for controlling the tipping mechanisms during the sewing.

17. An automatic shoe sewing machine, having, in combination, shoe sewing mechanism, a freely movable and rotatable shoe supporting jack, mechanisms for relatively tipping the sewing mechanism and shoe and for swinging the jack, and feelers engaging the shoe sole adjacent the point for controlling the tipping and jack swinging mechanisms.

18. An automatic shoe sewing machine, having, in combination, shoe sewing mechanism including a feeding device and channel guide, a freely movable and rotatable shoe supporting jack, mechanisms for swinging the jack and tipping the sewing mechanism, and a feeler arranged to engage the channel for controlling the tipping and swinging mechanisms.

19. An automatic shoe sewing machine, having, in combination, shoe sewing mechanism including a channel guide and feeding device, a shoe supporting jack, mechanisms for swinging the jack and tipping the sewing mechanism about two axes to maintain the sewing mechanism and shoe sole in proper relation at the sewing point, and feelers arranged to engage the channel and the surface of the sole within the channel for controlling the swing of the jack and the tip of the sewing mechanism.

20. An automatic machine, having, in combination, operating means, a form carrier, a feeler arranged to engage a form on the carrier, mechanism controlled by the feeler constructed and arranged to vary the position of the operating means without affecting the relation of the feeler to the form.

21. An automatic machine, having, in combination, a form carrier, an operating means, a feeler mounted independently of the operating means and arranged to engage a form on the carrier, and mechanism controlled by the feeler for varying the position of the operating means.

22. An automatic machine, having, in combination, a movable head, a form carrier mounted independently of the head, a feeler mounted independently of the head and arranged to engage a form on the carrier, and mechanism controlled by the feeler for varying the position of the head in accordance with the contour of the form.

23. An automatic machine, having, in combination, operating means, a work support movable to transfer the point of operation along the work, mechanism for tipping the operating means, a feeler mounted independently of the operating means and engaging the surface of the work adjacent to the point of operation, and controlling mechanism between the feeler and tipping mechanism for varying the tip of the operating mechanism in accordance with the position of the feeler when in controlling engagement with the work.

24. An automatic machine, having, in combination, operating means, a work support movable to transfer the point of operation along the work, mechanism for tipping the operating means transversely and longitudinally, feelers engaging the surface of the work adjacent to the point of operation, and controlling mechanisms between the feelers and tipping mechanisms for varying the tip of the operating mechanism in accordance with the transverse and longitudinal inclination of the surface of the work at the point of operation.

25. An automatic machine, having, in combination, a movable head, a form carrier mounted independently of the head, a feeler mounted independently of the head and arranged to engage a form on the carrier, mechanism for moving the head, and controlling mechanism between the feeler and said mechanism for rendering said mechanism active to change the position of the head upon a change and only upon a change in the position of the feeler when in controlling engagement with the form.

26. An automatic machine, having, in combination, a movable head, a form carrier, a feeler arranged to engage a form on the carrier, mechanism for moving the head, a controller positioned by the feeler, and intermittently acting mechanism coöperating with the controller to render said head moving mechanism active to change the position of the head upon a change in the position of the controller.

27. An automatic machine, having, in combination, a movable head, a form carrier, a feeler arranged to engage a form on the carrier, a controller positioned by the feeler, a coöperating controller cam having oppositely inclined cam surfaces for engaging the controller, a rotating drum, a roll engaging the drum, a roll carriage connected to move the head, and connections between the controller cam and roll through which the roll is turned at an angle to the drum by lateral displacement of the controller cam.

28. An automatic machine, having, in combination, a movable head, a form carrier, a feeler arranged to engage a form on the carrier, a controller positioned by the feeler, a second controller, intermittently acting mechanism coöperating with the first controller through which the second controller is also positioned by the feeler, a rotary drum, a roll engaging the drum, a roll carriage connected to move the head, and mechanism coöperating with the second controller for turning the roll at an angle to the drum upon a change in the position of the controller.

29. An automatic machine, having, in combination, a movable head, a form carrier, a feeler arranged to engage a form on the carrier, a controller positioned by the feeler, a rotary drum, a roll engaging the drum, a roll carriage connected to move the head, and a controller cam coöperating with the controller to turn the roll at an angle to the drum upon a change in the position of the controller.

30. An automatic machine, having, in combination, operating means, a work support, mechanism for relatively moving the operating means and work support to transfer the point of operation of the operating means along the work, mechanism for relatively tipping the operating means and work horizontally and transversely, and feelers arranged to travel along a form on the work support for controlling the tipping mechanisms.

31. An automatic shoe machine, having, in combination, operating means, a support therefor, a shoe support, mechanism for relatively moving the supports to transfer the point of operation along the shoe, mechanisms for moving one of said supports in planes at an angle to each other, and feelers arranged to travel along a form on the work support as the point of operation travels along the shoe for controlling said mechanisms.

ERASTUS E. WINKLEY.

Copies of this patent may be obtained for five cents each, by addressing the "Commissioner of Patents, Washington, D. C."